March 6, 1962    H. A. SEELE    3,024,372
AUTOMATIC CONTROL MEANS FOR SPRINKLERS
Filed Aug. 27, 1956    3 Sheets-Sheet 3
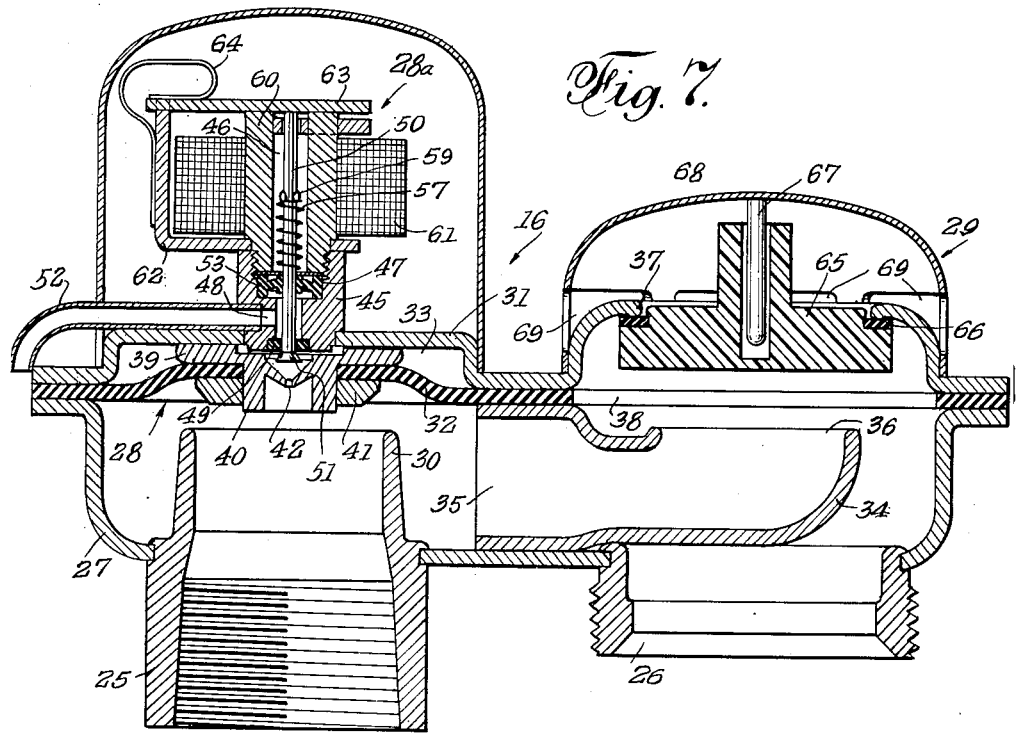
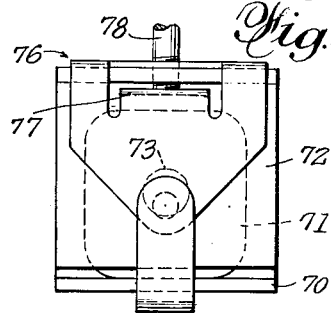
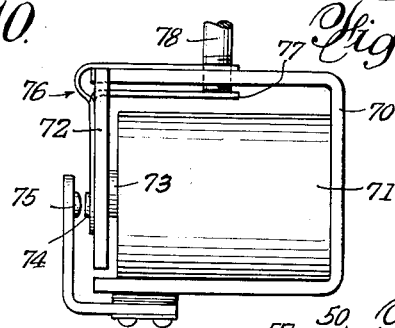
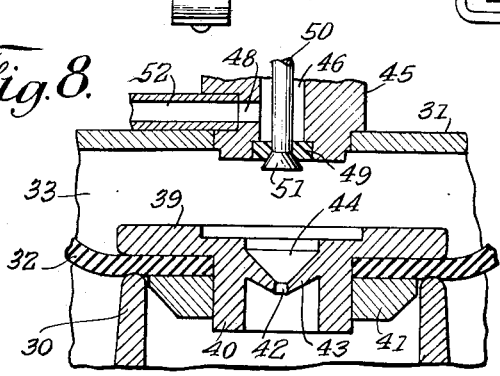
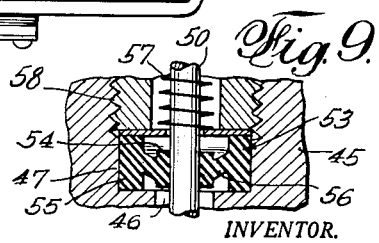
INVENTOR.
HAROLD A. SEELE
BY C. L. Stratton
ATTORNEY

United States Patent Office 3,024,372
Patented Mar. 6, 1962

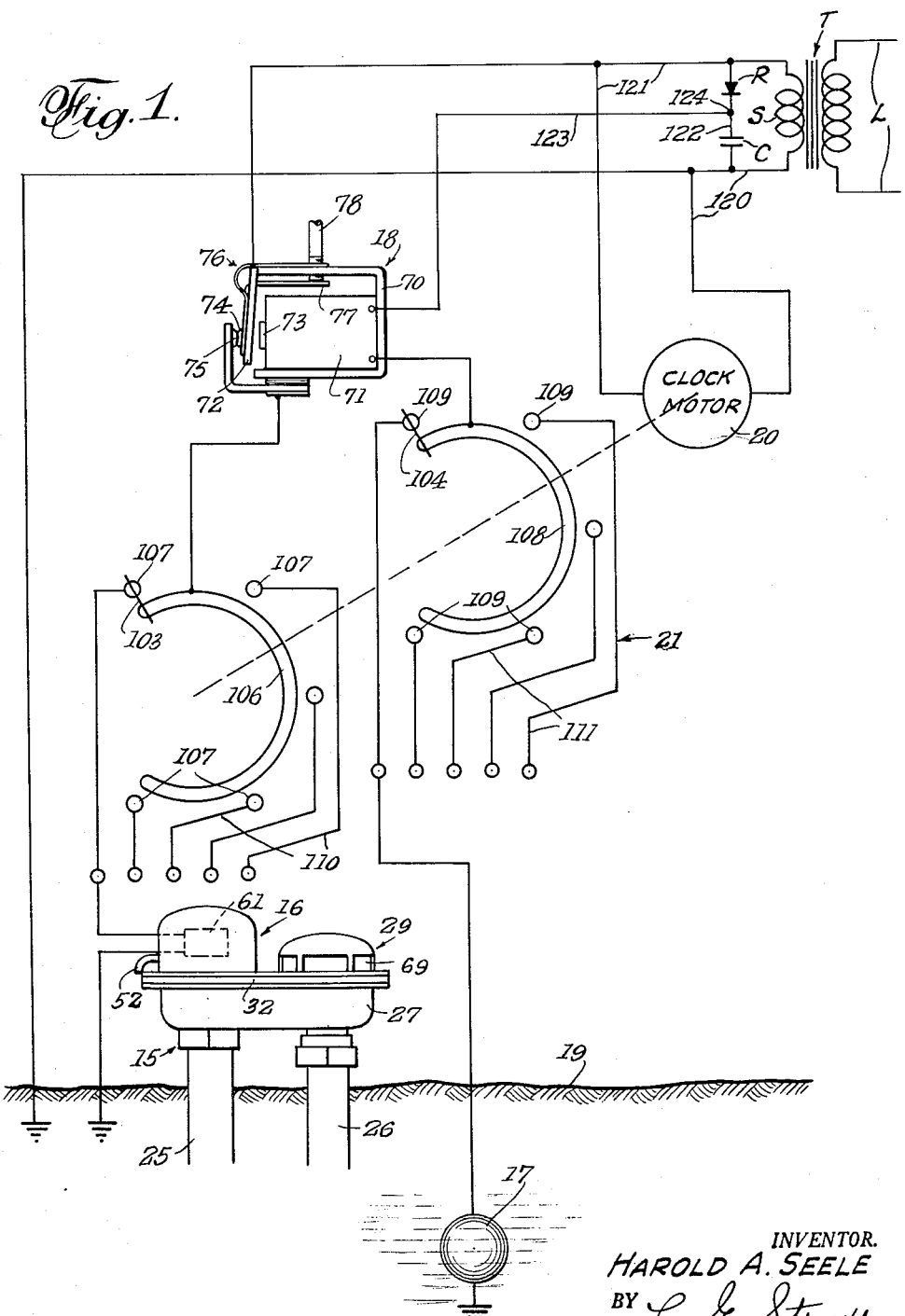

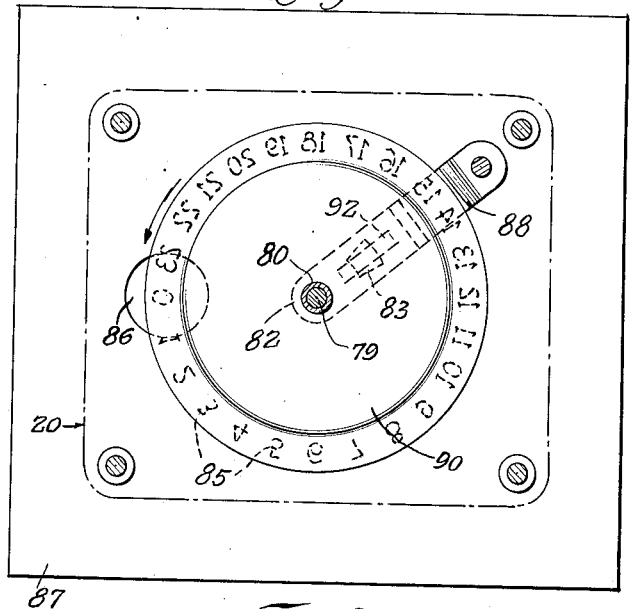

3,024,372
AUTOMATIC CONTROL MEANS FOR SPRINKLERS
Harold A. Seele, 2311-21 Southwest Drive,
Los Angeles 43, Calif.
Filed Aug. 27, 1956, Ser. No. 606,258
7 Claims. (Cl. 307—118)

This invention relates to means for effecting the automatic control of sprinklers for lawns generally and in connection with agricultural irrigation and other comparable uses.

Providing merely a time control for sprinkling or watering systems does not take into account the fact that, from day to day, the moisture content of the ground or soil may vary, largely because the general sub-soil drainage may vary and/or the evaporative effect of the sun may change according to weather conditions.

Since timed periodic watering may prove inefficient, it is an object of the present invention to embody auxiliary control means for time-controlled watering systems that varies in its operation according to the degree of moisture in the soil. Thus, should there be sufficient soil moisture present, the timed system will not operate. Also, some additional moisture may be needed but in limited amounts. Hence, the present invention contemplates the provision of moisture sensing means, in a time-controlled operating system, that will render said system inoperative after supplying such additional ground water as may satisfy the sensing means.

Another object of the invention is to provide novel and improved time-controlled mechanism for enabling presetting the time of operation of watering means so that the same may function at the time and for the period desired.

A further object of the invention is to provide mechanism of the chraracter referred to that simultaneously controls the operation of a water-flow control valve and a moisture sensor means enabling the automatic starting and stopping of soil watering according to the amount of water already in the soil.

A still further object of the invention is to provide control means, as hereinbefore indicated, that is operated by a single prime mover or motor.

A yet further object of the invention is to provide a circuit controller that responds to variations in current flow in a moisture-sensing circuit, said controller normally maintaining a time-controlled circuit and opening the latter circuit upon lowering of electrical resistance as caused by ground moisture.

A further object of the invention is to provide an improved controller, as above, that may be mechanically adjusted to vary its operation according to desired changes in moisture-changing resistance.

A further object of the invention is to provide a novel and improved solenoid-controlled valve to control flow in a sprinkler system.

A still further object of the invention is to provide a valve of the character referred to that operates on pressure differential on opposite sides of a diaphragm and to embody in said valve a solenoid-actuated valve stem provided with an effective and novel seal that enables light action forces to be applied to said valve.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate siimlar parts in the several views.

FIG. 1 is a diagrammatic view of an automatic control means for sprinkler and similar systems, the same embodying principles of the present invention.

FIG. 2 is an elevational view, with the mounting means in cross-section, of time-controlled switch means shown diagrammatically in FIG. 1.

FIG. 3 is a sectional view, with parts broken, of the means shown in FIG. 2, the view being taken on a plane rearward of the front of FIG. 2.

FIG. 4 is a fragmentary sectional view, taken on a plane rearward of the front of FIG. 3.

FIG. 5 is an enlarged cross-sectional view as taken approximately on the line 5—5 of FIG. 3.

FIG. 6 is an enlarged fragmentary view of a detail of construction, the same being taken generally in the plane of line 6—6 of FIG. 4.

FIG. 7 is a vertical sectional view of a flow-controlling valve such as shown in FIG. 1.

FIGS. 8 and 9 are enlarged detailed portions of FIG. 7 in another operative position.

FIG. 10 is an end view of a resistance-sensitive relay such as shown in FIG. 1.

FIG. 11 is a side elevational view thereof.

The present automatic control means comprises, generally a sprinkler or similar watering line 15 embodying a control valve 16, a sensor device 17 buried in the ground served by the sprinkler line 15, an electro-magnetic switch 18 responsive to current flow instituted in the sensor 17 according to the moisture content of the ground 19 in which said sensor is buried, a timer device, such as a clock 20, and switching means 21 operated by the clock and connected to said switch 18, sensor 17 and valve 16 to control operation of said valve according to the resistance of the circuit controlling operation of the switch 18.

The watering line 15 is generally conventional and includes an inlet 25 and an outlet 26, the latter being fitted with one or more sprinkler heads or other outlet devices.

The control valve 16 is shown in FIGS. 7, 8 and 9. The same comprises, generally, a body 27 to conduct flow between the inlet 25 and outlet 26, a shut-off valve 28 controlling said flow, means 28a to operate the shut-off valve 28, and a vacuum breaker 29 to prevent reverse flow in the watering line 15.

The inlet 25 is provided with a collar 30 that extends into the body 27, the latter being closed by a cap plate 31 between which and the body is disposed a flexible diaphragm 32. Between the cap plate and diaphragm is formed a pressure chamber 33 that is disposed above and in alignment with the inlet collar 30.

Above the outlet 26, the body 27 is provided with a flow diverter 34 that has a lateral inlet end 35 and an upwardly directed outlet 36. Above the latter outlet, the cap plate is provided with an open valve seat 37, said seat and outlets 36 and 26 being substantially vertically aligned. The diaphragm 32 is provided with an enlarged opening 38 that allows communication between the interior of the valve body and the opening defined by valve seat 37.

The shut-off valve 28 is carried by the diaphragm 32 in line with collar 30 and comprises a flange 39 on the side of the diaphragm toward chamber 33, a hub 40 extending from said flange through the diaphragm, and a nut 41 on said hub on the opposite side of the diaphragm. Said hub is provided with a central orifice 42 of bleeder size, the same being provided in an inverted conical wall 43 that defines an upwardly facing depression or cavity 44.

The shut-off valve 28 further includes a body 45 extending upwardly from cap plate 31, the same being formed with a central passage 46, an aligned counterbore 47, and a lateral opening 48, all in direct communication. Said passage 46 opens into chamber 33 and a valve disc 49 is interposed, the same being carried by the body 45. A valve stem 50 is disposed vertically in said passage 46 with ample clearance, the lower end of said stem being provided with a conically shaped valve end 51 that controls the aperture in valve disc 49.

Since the chamber 33 is capable of receiving liquid from the inlet 25, the same passing through orifice 42 and said liquid, after entering passage 46 (when stem 50 is depressed), may seek its way upwardly, although most of such liquid will drain through opening 48 and outwardly through tube 52, the counterbore 47 is fitted with a rubber seal 53 that is shown in FIGS. 7 and 9. Said seal is provided with a central stem-gripping hub 54, an outer annular bore-filling flange 55 and a connecting flexible web 56. Thus, regardless of the endwise movement of stem 50, the seal 53 will effectively intercept liquid in passage 46 and prevent the same reaching the valve-operating means 28a which, in this instance, is electrical. In its operation, the web 56 not only flexes between the two positions shown in said FIGS. 7 and 9, but the hub 54 of the same frictionally grips stem 50 and yet allows the same to be moved endwise with a sliding movement through said hub.

A spring 57, between an abutment plate 58 above the seal 53 and an enlargement 59 on stem 50, biases said stem in a direction to cause the valve end 51 thereof to close the aperture in disc 49.

The valve-operating means 28a is shown as a magnetic core 60 extending upwardly from body 45 and surrounded by a coil 61. A frame 62 mounts a pivoted armature 63 that is subject to the magnetic flux generated in core 60 when the coil 61 is electrically energized. Normally, spring 57, in holding the aperture in valve disc 49 closed, holds the upper end of stem 50 projected somewhat above the upper end of said core. When attracted to the core against the bias of spring 64, the armature 63 will depress said stem and open said orifice to flow from pressure chamber 31 to drain 52.

Normally, the diaphragm 32 is engaged with the end of the collar 30 and the flow is arrested by said diaphragm because the total pressure on the diaphragm on its under side, is that of the area of the inlet, while the total pressure on the upper face of the diaphragm is that of the larger pressure chamber 31. Said chamber receives its pressure through orifice 42 and the same is retained because the valve end 51 is biased to closed valve disc 49.

To institute flow between inlet 25 and outlet 26, the coil 61 is energized, causing depression of stem 50 and venting of pressure chamber 31. Upon such release of pressure from the top face of the diaphragm, the pressure in collar 30 is effective to move the same to the open position shown. This position is maintained so long as the coil 61 remains energized because the vent or drain 52 remains open.

Flow is stopped by de-energizing coil 61 to allow the spring 57 to bias the stem 50 and its valve end 51 to closed position. Now, as the pressure in chamber 33 builds up through flow past orifice 42, the pressure on the upper face of diaphragm 32 increases. Since there is a substantial pressure drop between the pressure on the under face of the diaphragm directly above the inlet and on marginal portions of said diaphragm, the total pressure on the upper face will eventually become greater than the total pressure on the under face and the diaphragm will move to flow-stopping position.

The vacuum breaker 29 comprises a valve disc 65 that is provided with resilient valve ring 66 adapted to engage the valve seat 37 from beneath. Said disc is guided by a pin 67 carried by a hood or cover 68 in which openings 69 are provided, the same opening the valve seat to atmosphere.

When valve 28 is closed, disc 65 falls by gravity onto diverter outlet 36. Thus, any back flow from outlet 26 will apply its pressure to the upper side of said disc 65 to press the same closed and prevent such back flow from entering inlet 25. Valve seat 37 and openings 69 will drain such back flow, if excessive. When valve 28 is opened, the flow from the inlet will enter the diverter 34 and unseat disc 65, moving the same upwardly so that the valve seat 37 is engaged by valve ring 66. Now, the flow may enter the outlet 26.

The sensor device 17 which, per se, forms no part of the present invention and which constitutes a resistance that varies according to the moisture content of the ground 19 within which it is buried, may vary widely in form. The same comprises a unit or device that is either totally resistant to current flow or, at least, highly resistant to such flow when in a dry medium or environment, and decreases its resistance as moisture or water is added to said medium or environment. The sensitivity of such moisture-responsive sensors may be varied and/or their size may also be varied according to requirements by the plant life served by the present control means.

The electro-magnetic switch 18 normally has a closed position which is retained when the resistance in the sensor 17 is high and the same moves to open position when the resistance decreases to a predetermined degree.

Said switch 18 comprises a frame 70 in which is mounted an electro-magnetic coil 71 and which carries an armature 72 that is attracted to the core 73 of said coil when magnetized. Said armature may carry one contact 74 and the frame may mount a second contact 75 of a single-pole switch.

A spring member 76 is biased to normally hold said switch contacts 74 and 75 closed, as may be seen in FIG. 1, the same being separated when the coil 71 is electrically energized, as in FIG. 11.

The biasing force of spring member 76 may be mechanically adjusted to provide a sensitivity of operation, as desired. To this end, said spring member 76 is provided with a finger 77 that is engaged by an adjustable shaft or comparable member 78 that varies the tension of said finger. Thus, the electromotive force necessary to cause attraction of the armature 72 and opening of the switch contacts 74 and 75 must reach a degree capable of overcoming the bias of spring member 76 as adjusted by member 78.

The timer device or clock 20 is not shown in detail since the same may be made in various ways and may be electrically operated, as shown, or spring operated. In any case, said clock has two concentric output shafts, the fast shaft 79 making one revolution per hour and the slow shaft or sleeve 80 making one revolution per day or twenty-four hours. These relative rates of rotation are exemplary and may be varied as desired. The back plate 81 of the clock is used for mounting the switch means 21, the shaft 79 and sleeve 80 extending through said plate (FIG. 5).

The switching means 21 is detailed in FIGS. 2 to 6, and is operated by said fast and slow shafts.

Sleeve 80 carries a flanged disc 82 on the rear face of which is provided a cam 83, it being clear that said cam makes one revolution around the axis of sleeve 80 in each twenty-four hours. The flange 84 of said disc, on its rear face, is provided with members 85 indicative of hours, the same being readable through a hole 86 provided in a dielectric back plate 87 of said means 21. The location of the cam 83 can be determined by reading of the hour as seen through said hole 86.

A bracket 88, fastened at one end 89 to plate 81 and having its other end 90 apertured to pass shaft 79, carries a rise 91 that is engaged by cam 83 once every twenty-four hours. Said bracket being resilient, the same is deflected rearward by cam 83.

On the rearward side of bracket 88, and slidably mounted on shaft 79 but keyed thereto to rotate with the shaft, is provided a clutch disc 92, the same being provided with a rearwardly directed clutch tooth 93. Disc 92 is biased forward by a spring 94, said spring yielding to the action of cam 82 to press the clutch disc rearwardly.

A flanged hub 95a is provided, the same being an aligned extension of shaft 79 with which it has an aligning connection 117.

On said hub 95a is rotatably carried a plate 95 which is formed as a forwardly directed clutch tooth 96a that is rearwardly clear of tooth 93 except when the cam 82 rearwardly presses the bracket 88. When the clutch teeth are engaged, as shown in FIG. 3, rotation of clutch disc 92 is imparted to plate 95. Said latter plate is provided with one or more rearwardly extending legs 96 that space said plate from a disc 97 mounted on the forward face of the back plate 87. An additional leg is formed as a cam 98.

In the space provided above, is disposed a contact arm 99 that is resiliently connected to plate 95 by a torsion spring 100. Said arm is provided with a resilient lock tooth 101 that has successive abutting engagement with abutments 102 that are defined by holes formed in disc 97. Said arm 99 is provided with a contact end 103 and inward of said end, the arm carries a bridging contact 104, the same being insulated from the arm as by a block 105.

It will be realized that spring 100 also biases arm 99 in a direction to engage tooth 101 with one of the abutments 102 and that rotation of plate 95 first builds up torsion in spring 100 and then, when said torsion becomes great enough, imparts rotative movement of the arm.

In connection with the contact end 103 of arm 99, there is provided an arcuate contact bar 106 which is associated with a series of arcuately spaced contacts 107 that overstand said bar so that arm end 103 may assume a position bridging said bar and one of the contacts, as shown in FIG. 3.

In connection with bridging contact 104, there is provided a second arcuate contact bar 108 with which is associated a series of arcuately spaced contacts 109. Said contacts 109 are so located that, when arm end 103 is disposed in bridging engagement between bar 106 and a contact 107, the bridging contact 104 will bridge across bar 108 and a contact 109.

At hourly intervals, or such other intervals as may be desired, clutch tooth 93 will pass by clutch tooth 96 and, only when the cam 83 is in engagement with bracket rise 91, will said bracket be deflected to engage the clutch teeth to institute building up of torsion in spring 100. When said torsion is high enough, the arm 99 will be moved from one position to the next, bridging between bar 106 and contacts 107, on the one hand, and bar 108 and contacts 109 on the other. It will be realized, of course, that spring 100 is ineffective until cam 98 engaged the resilient lock tooth 101 (FIG. 6) to withdraw the same from engagement with an abutment 102.

After cam 83 leaves the rise 91, the clutch is disengaged. However, the electrical contacts made between bar 106 and its contacts 107 and bar 108 and its contacts 109 are retained.

The circumferential extent of cam 83, together with the effective width of rise 91, controls the circuit-closing operation of the clutch. Thus, this extent may be equal to one hour of the rotation of cam 83, thus holding the clutch engaged during one revolution of clutch plate 92, so that the successive circuits 110 may be closed by bridging contact 103 while successive circuits 111 may be made by contact 104. Each circuit 110 is connected to a valve controller 28a of a different valve 16 and each circuit 111 is connected to a different sensor 17 associated with each respective valve 16.

Since the coil 61 of each controller 28a is also grounded, Bar 106 is connected to one side of a source of current, through switch 74—75, the opposite side being grounded. it will be seen that coils 61 can be energized only when said switch 74—75 is closed, irrespective of the bridging contact 103.

Since the switch 74—75 is opened when the sensor 17 to which it is connected has lowered resistance to current flow, a condition indicating moisture in the soil, the circuit to the coil 61 is opened and, regardless of the time control, the water will not flow in valve 16.

It will be seen that the time control is applied in the same way at all times and that the electro-magnetic switch means 18 acts as a master for the valve-controlling circuits and responds to variations in moisture content in the ground 19.

The arm 99 is located by the lock toooth 101 engaging an abutment 102 and retains this position until spring 100 is tensioned. Then, cam 98 withdraws said tooth, allowing the spring to snap the arm 99 to the next position, which is again locked by tooth 101. The rapidity of the break and make will be obvious.

The circumferential extent of cam 82 may be increased so that the clutch teeth 93 and 96a will retain engagement for more than one hour, i.e., for two or more revolutions of the fast shaft.

A knob 115 on the end of an extension 116 of flanged hub 95a may be used as a manual control for overriding the clock-driven shaft 79. Thus, the switch means may be manually controlled, as desired.

The element 17 is described as a device that delivers current according to the resistance thereof. The same may be made merely as an anode or ground terminal and dependence placed on the variation of resistance in the ground 19 between said element and the ground connections of valve 16.

As shown in the diagram of FIG. 1, the source of power for the present means is a step down transformer T that changes the current in line L to current at a lower voltage in the secondary coil S of said transformer. The clock motor 20 is connected across said coil S by the conductors 120 and 121. A shunt conductor 122 extends across conductors 120 and 121, a condenser C and a rectifier R being provided in conductor 122. The conductor 120 is extended to connect to ground, the conductor 121 is extended to connect to the switch armature 72 and, therefore, to the contact 74, and a conductor 123 extends between a connection 124 in line 122 and the coil 71 of the switch 18.

The condenser C constitutes a current-storing device or battery that is energized with and stores direct current supplied by the rectifier R which serves as a battery charger. Therefore, the current of transformer coil S passes in a circuit through switch 74—75 and in series through coil 61 to ground, as well as through timer 20 which is across said circuit. Only the half-cycle or direct current charge stored in condenser C energizes the coil 71 through conductor 123 and, through the switch means 21, connects to sensor 17 and thence, through ground, to conductor 120.

It will be seen from the foregoing that the described switch means 21 operates a plurality of circuits under control of both a timing device and a device responsive to a predetermined current; that said circuits operate in sequence or in consecutive order to control a flow valve and a corresponding moisture-sensing device; and that, as desired, one such sensing device may be operatively associated with more than one flow-controlling valve.

While the foregoing has illustrated and described what is now contemplated to be the best mode of carrying out my invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A ground-watering control circuit comprising, in combination, a direct current source, a connection from said source to ground, a conductor from said source for connection to a unit buried in the soil adjacent said ground to measure the electrical resistance of the soil between the ground and the unit, an electro-magnetic switch having normally closed contacts, and a coil to open said contacts and connected to and energizable by direct current flowing in said conductor, first time-controlled means in series in said conductor and interconnecting the mentioned coil of the switch and said unit, thereby connecting said switch and unit to said direct current source whereby said coil is energized upon a predetermined lowering of the resistance at said conductor and the contacts controlled by the coil to close the contacts, alternating current supply terminals, second time-controlled means connected in electric circuit with said contacts of the electromagnetic switch and with the alternating current supply terminals, and a control circuit in series with said contacts for intermittent energization subject to condition of the circuit of the resistance-measuring conductor.

2. Apparatus according to the combination of claim 1, in which a single clock mechanism is provided operatively connected to the two time-controlled means.

3. Apparatus according to the combination of claim 1, in which a mechanically-tensioned regulator is provided in the electro-magnetic switch to control its response to the condition of the circuit of the resistance-measuring conductor.

4. A control circuit comprising in combination, current supply input terminals, a time switch having two sets of contacts, first conductors from said terminals for connection to an electrical device to be controlled, second conductors from said terminals for connection to a variable conductivity control element, a relay having normally-closed contacts and an actuating coil, a rectifier, the actuating coil and the one set of time switch contacts being connected in series with the rectifier and the second conductors, and a second set of time switch contacts and said relay contacts being connected in series with the first conductors.

5. A control system for actuating apparatus in response to variations in ground condition, comprising in combination, alternating-current supply input terminals, a time switch having two sets of contacts, first conductors from said terminals for connection to an alternating-current electrical device to be controlled, a second pair of conductors from said terminals, a sensor buried underground connected to one of said second pair of conductors, the other of said second pair of conductors being grounded, a relay having normally-closed contacts on an actuating coil, a rectifier, the actuating coil and one set of time switch contacts being connected in series with said rectifier and with the second conductors, and the second set of time switch contacts and said relay contacts being connected in series with the first conductors.

6. A control circuit comprising in combination, alternating current supply input terminals, direct-current supply input terminals, a time switch having two sets of contacts, first conductors from said alternating-current terminals for connection to an electrical device to be controlled, second conductors from said direct-current terminals for connection to a variable conductivity control element, a relay having normally-closed contacts and an actuating coil, the actuating coil and one set of time switch contacts being connected in series with the second conductors, and the second set of time switch contacts and said relay contacts being connected in series with the first conductors.

7. A circuit as in claim 4 with a condenser connected across said second conductors.

References Cited in the file of this patent

UNITED STATES PATENTS

| | | | |
|---|---|---|---|
| 2,290,145 | Owens | July 14, | 1942 |
| 2,532,624 | Kircher | Dec. 5, | 1950 |
| 2,599,862 | Ray | June 10, | 1952 |
| 2,604,267 | Smith | July 22, | 1952 |
| 2,632,071 | Rinke | Mar. 17, | 1953 |
| 2,668,589 | Illian | Feb. 9, | 1954 |
| 2,708,553 | Dyer | May 17, | 1955 |
| 2,721,101 | Richard | Oct. 18, | 1955 |
| 2,730,117 | Sversky | Jan. 10, | 1956 |
| 2,753,933 | Wolfe et al. | July 10, | 1956 |
| 2,754,150 | Edelman | July 10, | 1956 |
| 2,777,515 | Stirling | Jan. 15, | 1957 |